(12) United States Patent
Packham et al.

(10) Patent No.: US 11,928,896 B2
(45) Date of Patent: Mar. 12, 2024

(54) AUTO-CALIBRATING RANGE SENSING GATE

(71) Applicant: Cubic Corporation, San Diego, CA (US)

(72) Inventors: Jonathan Packham, Ashford (GB); Steffen Reymann, Guildford (GB)

(73) Assignee: Cubic Corporation, San Diego, CA (US)

( * ) Notice: Subject to any disclaimer, the term of this patent is extended or adjusted under 35 U.S.C. 154(b) by 562 days.

(21) Appl. No.: 17/152,533

(22) Filed: Jan. 19, 2021

(65) Prior Publication Data
US 2021/0225091 A1    Jul. 22, 2021

Related U.S. Application Data

(60) Provisional application No. 62/962,377, filed on Jan. 17, 2020.

(51) Int. Cl.
| | | |
|---|---|---|
| *G07B 15/00* | (2011.01) | |
| *G01S 17/86* | (2020.01) | |
| *G01S 17/89* | (2020.01) | |
| *G07B 15/04* | (2006.01) | |

(52) U.S. Cl.
CPC .............. *G07B 15/04* (2013.01); *G01S 17/86* (2020.01); *G01S 17/89* (2013.01)

(58) Field of Classification Search
CPC ......... G07B 15/00; G07B 15/04; G01S 17/00; G01S 17/74; G01S 17/86; G01S 17/87; G01S 17/89

See application file for complete search history.

(56) References Cited

U.S. PATENT DOCUMENTS

| | | | | |
|---|---|---|---|---|
| 4,360,796 A * | 11/1982 | Shocknesse | ........... | G07G 3/003 340/928 |
| 6,509,826 B1 * | 1/2003 | Loftus | ..................... | G07F 17/24 398/151 |
| 7,061,383 B2 * | 6/2006 | Davis | ..................... | G07B 15/00 340/572.1 |
| 8,558,885 B2 * | 10/2013 | Fitzgibbon | .............. | B66B 13/24 348/143 |
| 11,328,424 B1 * | 5/2022 | Fitzgibbon | .............. | E05F 15/73 |
| 11,538,250 B2 * | 12/2022 | Smith | ....................... | G06N 3/08 |
| 11,629,739 B2 * | 4/2023 | Wang | .................... | F16B 5/0266 411/337 |
| 11,682,119 B1 * | 6/2023 | Fitzgibbon | ................ | G06T 7/12 382/195 |

(Continued)

*Primary Examiner* — Chi Q Nguyen

(74) *Attorney, Agent, or Firm* — MUGHAL GAUDRY & FRANKLIN PC

(57) ABSTRACT

A fare gate in a transportation system including a barrier, a sensor, and an actuator. The actuator moves the barrier from the open position into the closed position. The sensor is mounted on the barrier and in one position captures sensor data across an aisle formed by the fare gate. A transit user in front of the barrier in another position is identified by the sensor. The transit user passes through the fare gate using the aisle. The actuator moves the barrier from a closed position to an open position to clear passage through the aisle. Using the sensor, the aisle is scanned with a movement of the barrier. The sensor is calibrated based on a predetermined point with movement of the barrier to align the sensor and the predetermined point.

12 Claims, 14 Drawing Sheets

(56) References Cited

U.S. PATENT DOCUMENTS

| | | | |
|---|---|---|---|
| 2003/0093305 A1* | 5/2003 | Davis | G06Q 10/02 |
| | | | 705/5 |
| 2004/0093181 A1 | 5/2004 | Lee | |
| 2006/0228177 A1* | 10/2006 | Allain | E01F 13/06 |
| | | | 404/6 |
| 2013/0205666 A1 | 8/2013 | Fortin et al. | |
| 2021/0287468 A1* | 9/2021 | Vilhelmsen | G01S 13/87 |
| 2023/0215234 A1* | 7/2023 | Faresse | G06V 40/10 |
| | | | 340/5.7 |

* cited by examiner

AUTO-CALIBRATING RANGE SENSING GATE

This application claims the benefit of and is a non-provisional of U.S. Provisional Application Ser. No. 62/962,377 filed on Jan. 17, 2020, which is hereby expressly incorporated by reference in its entirety for all purposes.

BACKGROUND

This disclosure relates in general to fare gates in transportation systems and, not by way of limitation, to calibration of fare gates.

A fare gate includes sensors to detect a transit user. Such sensors require calibration or have negative impact on various applications of the fare gate. Sensor degradation can stem from changes in lighting conditions, dirt on sensor surfaces, and/or normal wear and tear of the sensors, etc.

Maintenance of fare gate is costly and takes the fare gates out of service. Fare gates work in extremely challenging environments. High usage in rough conditions are typical. Components and systems that break or require maintenance can cause delay at stations during heavy traffic times.

SUMMARY

In one embodiment, the disclosure provides a fare gate in a transportation system includes a barrier, a sensor, and an actuator. The actuator moves the barrier from the open position into the closed position. The sensor is mounted on the barrier and in one position captures sensor data across an aisle formed by the fare gate. A transit user in front of the barrier in another position is identified by the sensor. The transit user passes through the fare gate using the aisle. The actuator moves the barrier from a closed position to an open position to clear passage through the aisle. Using the sensor, the aisle is scanned with a movement of the barrier. The sensor is calibrated based on a predetermined point with movement of the barrier to align the sensor and the predetermined point.

In another embodiment, the disclosure provides a fare gate for a transportation system. The fare gate includes a barrier, a sensor, and an actuator. The barrier is configured to move between a closed position and an open position. The sensor is mounted on the barrier and configured to: capture sensor data across an aisle formed by the fare gate, determine based on the sensor data that a first transit user is to pass through the fare gate along the aisle, scan the aisle with a movement of the barrier, and sense a plurality of distances across the aisle. The actuator is configured to actuate the barrier to move from the closed position into the open position. The sensor is calibrated after moving away from the closed position based on scanning across the aisle to a predetermined point read by the sensor.

In still embodiment, the disclosure provides a method of operating a fare gate for a transportation system. In one step, sensor data is captured using a sensor mounted to a barrier of the fare gate. Based on the sensor data it is determined that a first transit user is to pass through the fare gate along an aisle formed by the fare gate. The barrier is actuated to move into an open position to allow the first transit user to pass through the fare gate along the aisle. The aisle is scanned using the sensor with a movement of the barrier. The sensor is calibrated based on a predetermined point after the movement of the barrier.

In an embodiment, the disclosure provides software to cause the gate system to:
capture sensor data using a sensor mounted to a barrier of a fare gate;
determine based on the sensor data that a first transit user is to pass through the fare gate along an aisle formed by the fare gate;
actuate the barrier to move into an open position to allow the first transit user to pass through the fare gate along the aisle;
scan the aisle using the sensor with a movement of the barrier; and
calibrate the sensor based on a predetermined point as the movement of the barrier scans across the aisle during opening.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a second alphabetical label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Figure 1:
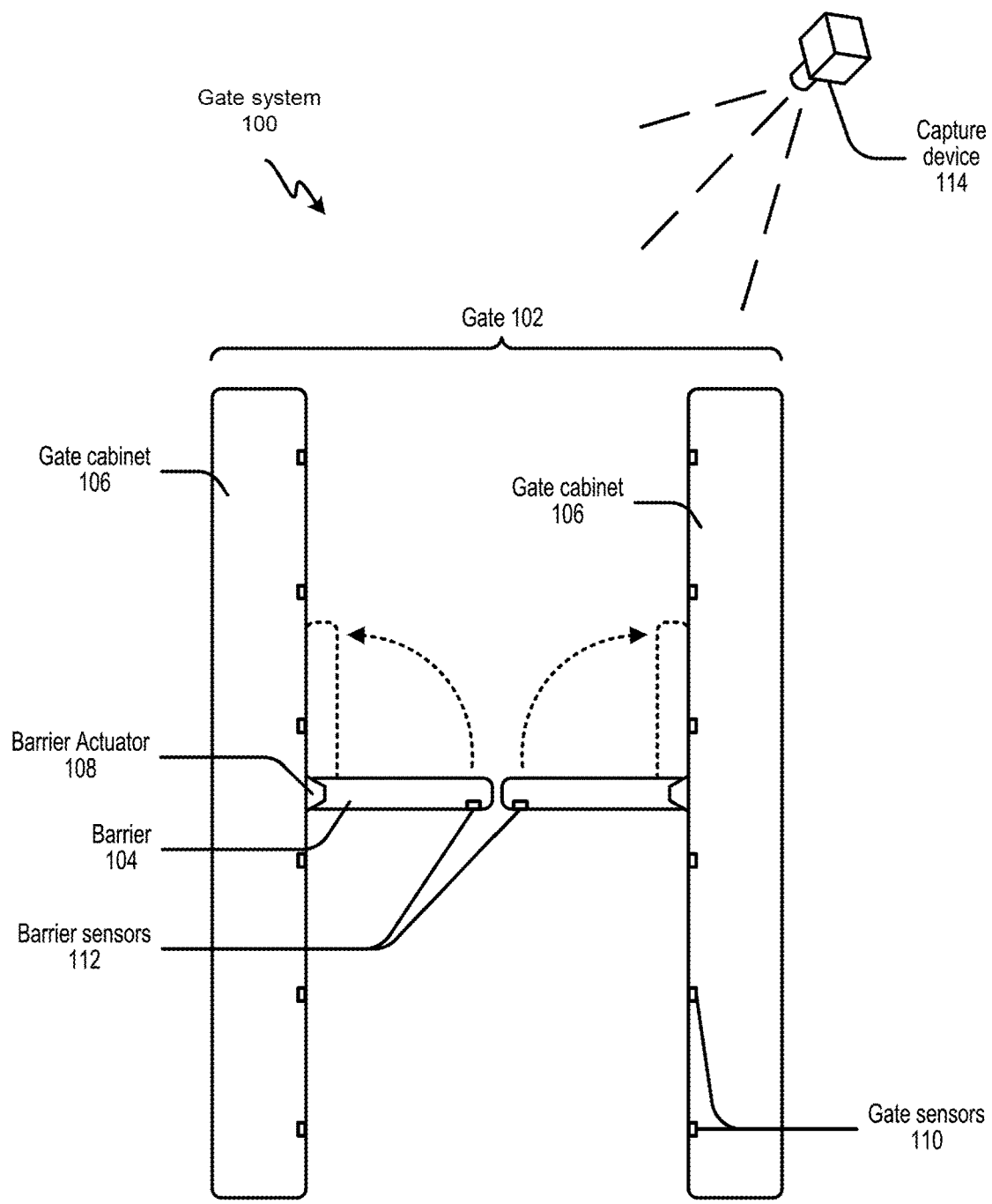
FIG. 1 depicts a block diagram of an embodiment of a gate system.

Referring to FIG. 1, illustrates a gate system 100 including a fare gate 102 or an access control point to allow a transit user to move through the fare gate 102 within a transit system. The gate system 100 includes the fare gate 102, a barrier 104, gate cabinets 106, a barrier actuator 108, gate sensors 110, barrier sensors 112, and a capture device 114 (e.g., a video or still camera).

The fare gate 102 may separate a restricted access area from a non-restricted access area within the transit system. Examples of the restricted access area may include a transportation platform (e.g., bus platform, train platform, etc.), the inside of a transportation station (e.g., bus station, train station, etc.), the inside of a transit vehicle (e.g., bus, train, etc.), the inside of a building, the inside of a concert venue, and the like.

The fare gate 102 may include a single or a pair of the paddles or barriers 104 that may be retractable or rotatable so as to move between an open position and a closed position. In an embodiment, the barrier 104 is closed by rotating the barrier 104 until it becomes parallel with one of a set of the gate cabinet 106. The barrier actuator 108 is mounted on the barrier 104 to move the barrier 104 between the open position and the closed position.

The barrier actuator 108 may be a rotary actuator, such as a servomotor, that allows precise control of angular position, angular rate, torque, and/or angular acceleration. For example, the barrier actuator 108 may include both a rotary actuator and a sensor that provides feedback of the current angular position of the barrier actuator 108, from which a position of the barrier 104 is determined. In another embodiment, the barrier actuator 108 is a linear actuator that allows precise control of linear position, linear velocity, and/or linear acceleration. For example, the barrier actuator 108 may include both a linear actuator and a sensor that provides feedback of the current linear position of the barrier actuator 108, from which the position of the barrier 104 is determined.

The capture device 114 captures images and/or video of the fare gate 102. The capture device 114 is a camera having a field of view covering at least part of the fare gate 102 or even a group of fare gates 102. The capture device 114 may be positioned above the gate 102 and oriented downwards so as to cover the gate 102 from a top-down view. Captured images may be in the visible and/or infrared wavelengths.

The gate sensors 110 may use laser sensors or beam sensors mounted to the inner surfaces of the gate cabinets 106 facing away from the gate cabinet 106 and towards the aisle. The gate sensors 110 may include a pair of infrared (IR) transmitter/receiver beam sensors, radar sensors, ultrasonic sensors, radar sensors, or any other kind of sensor that detects the presence of objects between the sensors along the aisle formed between two gate cabinets 106.

The barrier sensors 112 are mounted on the barriers 104 and may be oriented in the direction of incoming transit users when the barriers are closed so as to detect the distance between the transit users and the barriers 104 as the transit users approach the barriers 104. The barrier sensors 112 may be distance sensors, capacitive sensors, inductive sensors, ultrasonic sensor, Light Detection and Ranging (LIDAR) sensors, radar sensors, and the like.

The gate system 100 allows the barrier sensors 112 to calibrate itself each time the barrier 104 is opened. Each time the barrier 104 is opened, a measurement is taken across an aisle using the barrier sensors 112 whose orientation is directed across the aisle. The gate system 100 uses a predetermined aisle width between the two barriers 104 to compare with a measurement from the barrier sensor 112 for the purposes of calibration. The barrier 104 movement and the predetermined aisle width is used to auto calibrate the barrier sensor 112 each time the fare gate 102 is used. If the gate system 100 detects a mismatch between a measured width and an actual width, an adjustment factor can be calculated and used by the gate system 100 when measuring distances to transit users when the gate 102 is in operation.

Other embodiments could calibrate the barrier sensors 112 to any known point in the station, for example a nearby pole or wall. As the barrier 104 moves, the barrier sensor 112 might calibrate during the sweep against several known points. By measuring during a scan, the speed of the barriers 104 can also be determined and calibrate linear velocity settings.

A value of the adjustment factor is considered for environmental factors such as ambient light (for camera-based sensors) and dust and can be recorded by the system over time. In some instances, this can provide insight with regards to air pollution (impacting how much dust is on the sensor), local weather conditions (may impact light levels, humidity), and the like. These insights can be used for further analytics purposes to apply calibration corrections.

Sensor data gathered by the barrier sensors 112 and the gate sensors 110 are used to determine distance and speed/velocity of the transit users as they approach the gate 102. This is helpful to detect unusual behavior or intents (for example, attempts at fare evasion) or to prevent an accident when a child or the transit user approaching with a high speed towards the gate 102. In another embodiment, the gate sensors 110 are placed on sides of the gate cabinet 106 towards aisle to detect the transit users as they enter and exit from the fare gate 102. Additionally, for fare gates that allow bidirectional travel (users can enter or exit through either end of the aisle), it can be determined which user is closest to the fare gate 102 and is therefore allowed to pass through the fare gate 102 prior to other transit users.

The transit user may be walking alone; with a child; with a suitcase, bag, or other object, and/or in a wheelchair or other mobility device. The barrier sensors 112, gate sensors 110 and capture device 114 can gather information on the transit users to detect these situations automatically.

The barrier sensors 112 allows for safe gate operation, preventing the barrier 104 from closing when the transit users, are in the area of operation (referred as 'zone of operation') where the barriers 104 would possibly close on the transit user. Using the barrier and gate sensors 112, 110, distances to the transit users are monitored and it is determined when the transit users are within a threshold distance (for example, 6-10 inches) from the barriers 104. When the transit users are in the zone of operation, the barrier and gate sensors 112, 110 determine their presence and the movement of the barriers 104 into the closed position is overridden by the barrier actuator 108. Thereby, preventing the transit users from getting hurt by the movement of the barrier 104. The barrier sensors 112 scan the aisle while the barrier 104 moves and identifies whether the transit user is entering the gate 102 alone, with a luggage, and/or with a child before determining the transit user is within threshold distance from the barrier 104. Based on the identification, the barrier 104 is prevented from moving into the closed position by the barrier actuator 108 for sufficient time for the additional things that validly accompany the transit user to pass.

In another embodiment, the barrier sensors 112 are mounted along a vertical row on the barrier 104. Data is gathered by these barrier sensors 112 and is used to estimate a height and/or a shape of the transit user. The data is used to classify the transit users into different categories for example, child, suitcase, wheelchair, etc. Based on the categorization of the transit user, a timing of opening and closing of the barrier 104 is adjusted (e.g., increased or decreased) to improve safety and throughput efficiency. The categorization of the transit user is stored in a database (not shown) of the gate system 100.

In another embodiment, an additional gate sensor 110 is mounted on a side of the gate cabinet 106, the side facing towards the barrier 104 and the aisle. Data gathered by the gate sensor 110 along with the barrier sensors 112 is used to determine if a tailgating fare evasion incident (e.g., when two transit users walk through on a single validation) is taking place. The barrier and gate sensors 112, 110 enable a first-come-first-serve gate operation. By way of an example, a predetermined width of a transit user is used to compare with measurements from the gate sensors 110 and the barrier sensors 112. The measurements include distances to a front side and a back side of the transit user passing through the fare gate 102. If a single transit user is present, the sum of the measured distances should be fixed and should be equal to the predetermined width. If two transit users are present, the sum of the distances fluctuate over time and/or may exceed the predetermined width for a single individual. Upon detection of the fluctuation, a tail gating incident is reported and a transit personnel of the transit system are alerted.

Many benefits can be achieved by way of these embodiments including, but not limited to: (1) use of a single range barrier sensor 112 can be used instead of multiple beam gate sensors 110 to simplify gate design and remove the reliance on a row of gate sensors 110 in the gate aisle, (2) auto-calibration of the barrier sensors 112 prevents degradation of service due to environmental factors, thereby providing longer operation and reduced maintenance requirements, (3) use of a paddle-mounted distance barrier sensors 112 to enable first-come-first-serve fare gate 102 operation, (4) improved detection of tail gating fare evasion, (5) detection of other fare evasion behavior derived from the approach speed of passengers, (6) safer gate operation for many user groups such as children or those with luggage.

Figure 2:
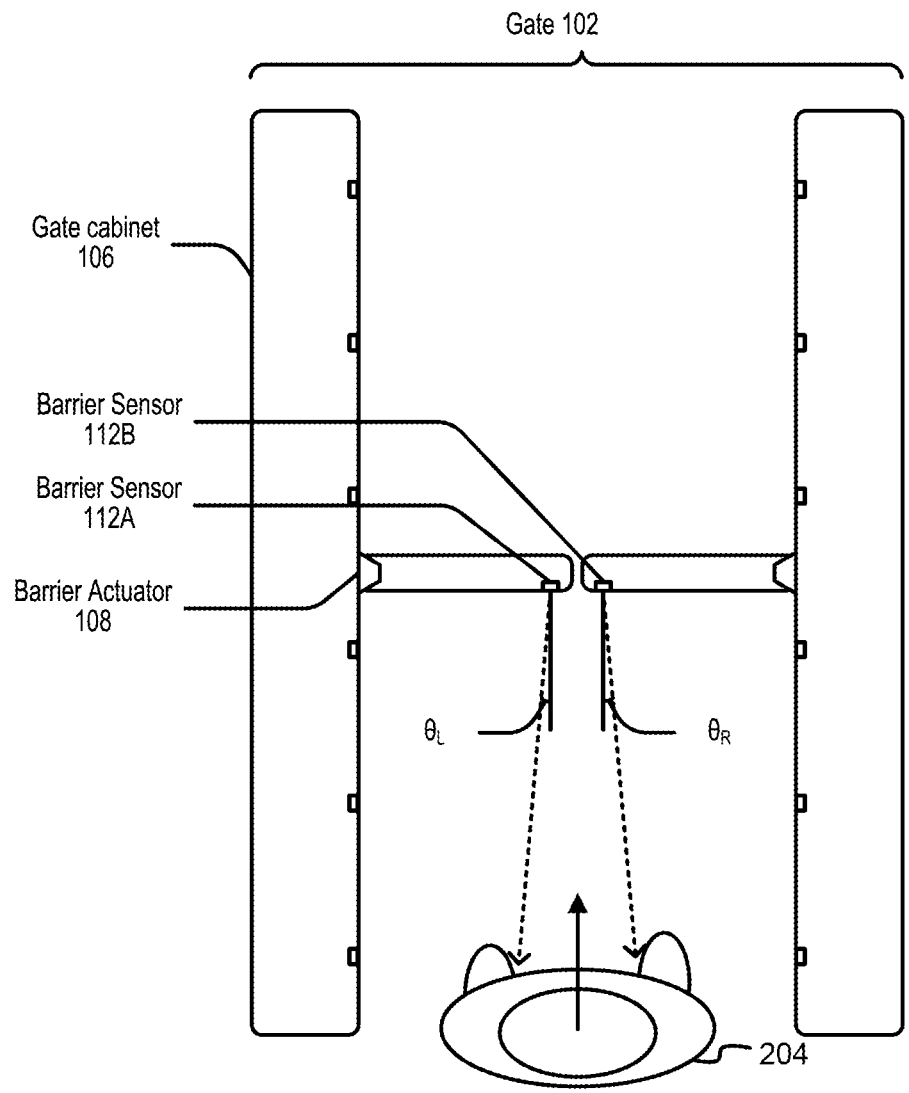
FIG. 2 depicts a block diagram of an embodiment of a gate system.

FIG. 2 illustrates an embodiment of the barrier sensors 112 mounted on the barrier 104 while the barrier 104 is in a closed position. The barrier sensors 112 are attached to and/or integrated with the barriers 104 and are oriented in the direction of the transit user 204 upon approach to the barriers 104. A left barrier sensor 112A has an orientation that is offset by $\theta_L$ from a line that is perpendicular to the barriers 104 and/or is parallel to the gate cabinet 106 and a right barrier sensor 112B has an orientation that is offset by OR from a line that is perpendicular to the barriers 104 and/or is parallel to the gate cabinets 106. The orientations $\theta_L$ and $\theta_R$ may vary between −45 and +45 degrees or other angles. The sensors 112 are oriented directly perpendicular to the barriers 104 and/or parallel to the gate cabinets 106 (e.g., $\theta_L$ and $\theta_R$ equal to 0 degrees).

The barriers 104 are shown in the closed position. During operation, the gate system 100 instructs the barrier actuators 108 to move the barriers 104 from the closed position into an open position. For example, the barrier actuators 108 may move the barriers 104 to rotate such that the barriers 104 become parallel to the gate cabinets 106.

In an embodiment, the barrier sensors 112 measure distances by converting a raw measurement (e.g., a signal strength) into a distance. A calibration value is maintained for each of the barrier sensors 112 that is multiplied by the raw measurement captured by the barrier sensors 112 to determine a measured distance. In another embodiment, the relationship between the raw measurement and the measured distances may be non-linear. For example, a first calibration value may be used for smaller raw measurements and a second calibration value may be used for larger raw measurements. Alternatively, various non-linear functions may be used to convert the raw measurements into the distances.

Figure 3:
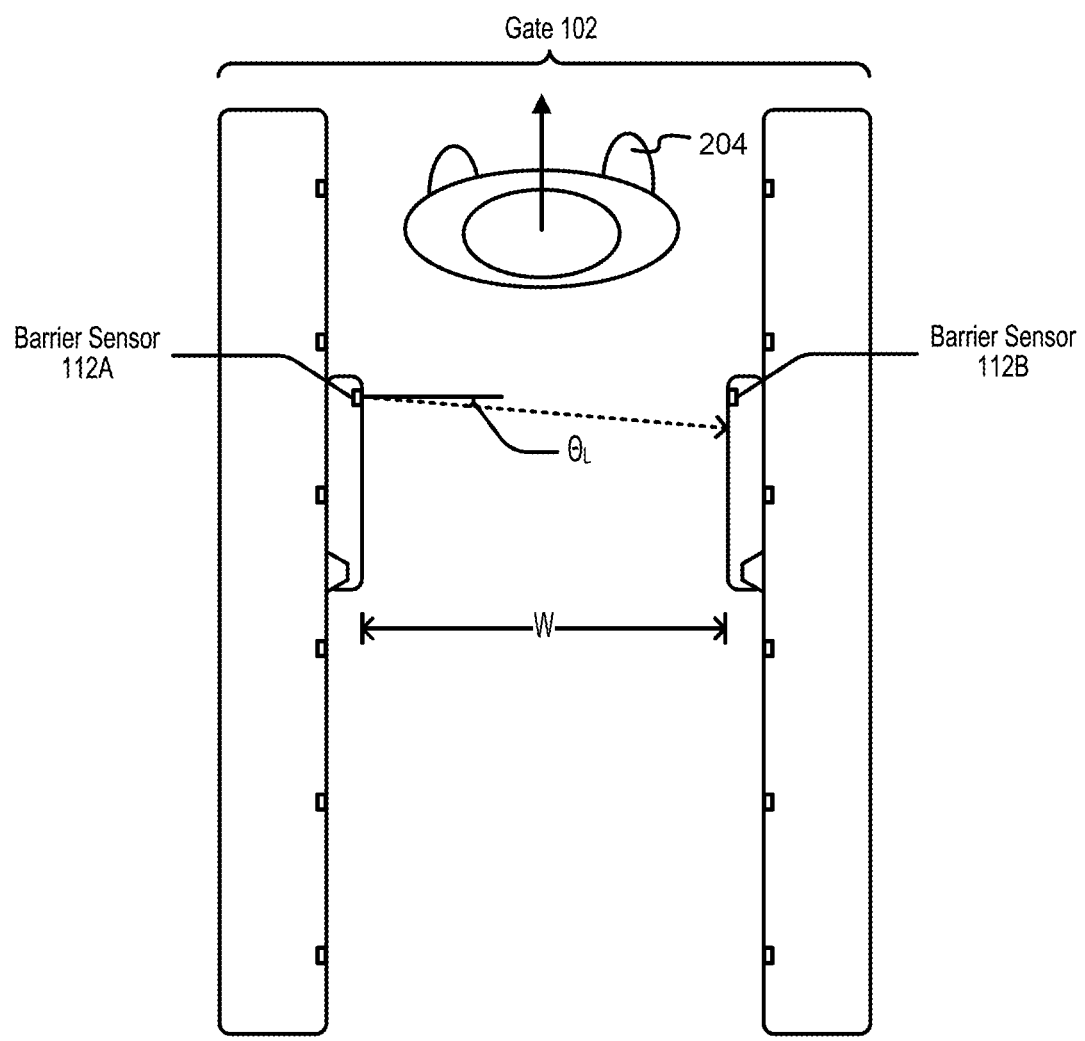
FIG. 3 depicts a block diagram of an embodiment of a gate system.

FIG. 3 illustrates an embodiment of the barrier sensors 112 mounted on the barrier 104 while the barrier 104 is in an open position. The barriers 104 are moved into the open position by the barrier actuator 108 such that the transit users 204 may pass through the fare gate 102 along the aisle formed by the gate cabinets 106. The barrier sensors 112 are calibrated while the barriers 104 are moved in the open position. This is accomplished by the barrier sensors 112 capturing raw measurements and relating the raw measurements to known distances between the barrier sensors 112 and portions of the fare gate 102 on an opposite side of the aisle. Such known distances are calculated based on a predetermined width W associated with the gate 102. The predetermined width W corresponds to the width of the aisle, such as the distance between the left gate cabinet 106 and the right gate cabinet 106, the distance between the left gate cabinet 106 and the right open barrier 104, the distance between the right gate cabinet 106 and the left open barrier 104, and the like.

The gate system 100 determines a presence or absence of the transit user 204 in the aisle using the sensors 112. Further, the barrier sensors 112 are calibrated using the predetermined width. While the barriers 104 are in the open position, the left barrier sensor 112A captures a raw measurement. The raw measurement may use a recent calibration value to convert the raw measurement into a measured distance. The measured distance is compared to an actual distance, where the actual distance is calculated using the formula: Actual Distance=$W/\cos(\theta_L)$. If the measured distance is greater than the actual distance, the calibration value is decreased such that the measured distance is set equal to the actual distance. Similarly, if the measured distance is less than the actual distance, the calibration value can be increased.

After the left barrier sensor 112A captures a raw measurement while the barriers 104 are in the open position, the calibration value is obtained by dividing the actual distance by the raw measurement and ignoring the previous calibration value. The left barrier sensor 112A captures a raw measurement while the barriers 104 are in the open position, the calibration value is incremented or decremented by a predetermined amount (for example, 1%) such that the gate system 100 avoids any overcorrection of the calibration value.

Figure 4A:
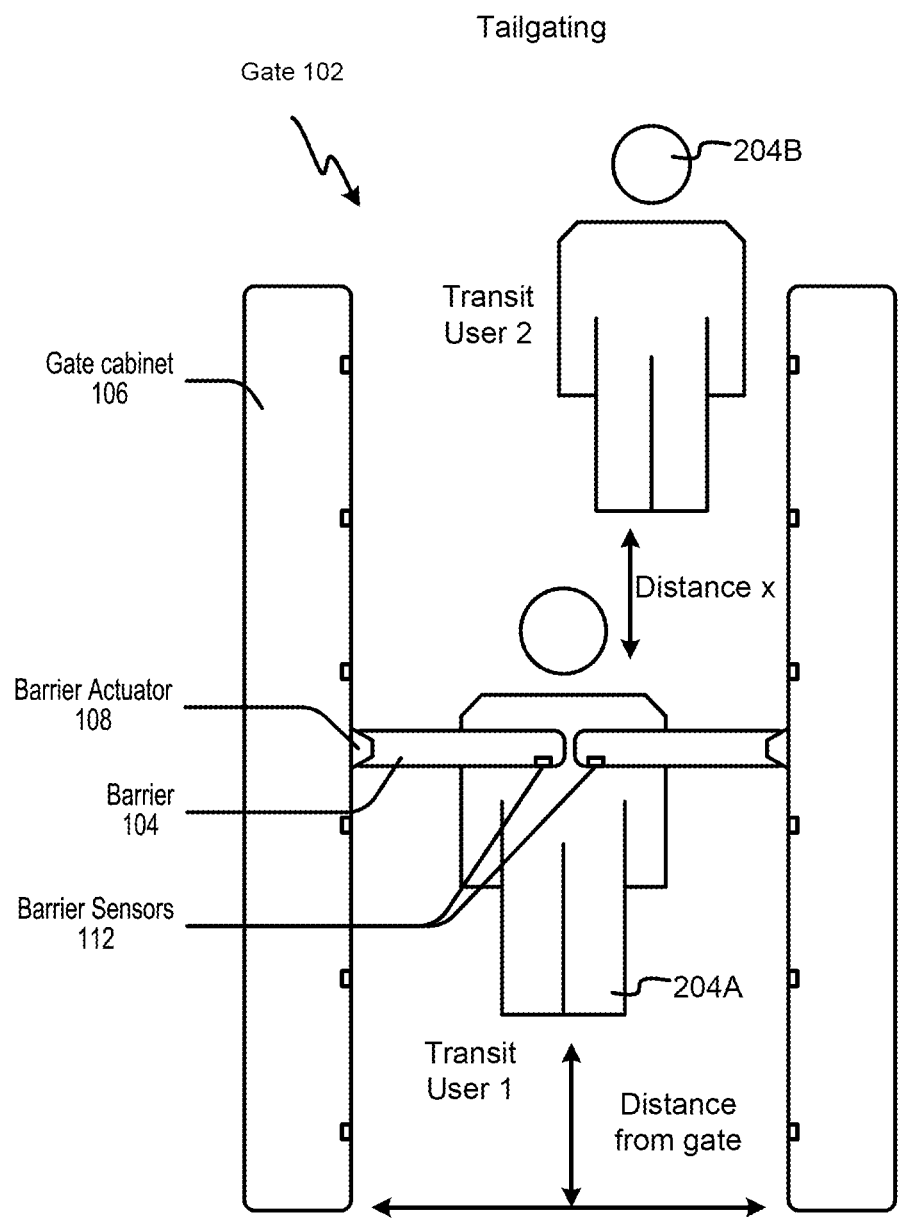
FIGS. 4A-4C depict block diagrams of embodiments of transit user(s) interacting with a fare gate.

FIG. 4A illustrates an embodiment of avoiding tail gating at the fare gate 102. Two transit users, first transit user 204A and second transit user 204B, approach the gate 102. The first transit user 204A is closer to the barrier 104 of the gate 102 then the second transit user 204B. The barrier sensors 112 identify the first transit user 204A and the second transit user 204B. The sensors 112 identify the two transit users 204 as both being likely adults based on the height information obtained using data gathered across the fare gate 102.

The gate system 100 determines a distance x between the first transit user 204A and the second transit user 204B and compares the distance x with a predetermined distance threshold to determine a likely tailgating situation. The predetermined distance threshold may be obtained from the database of the gate system 100. Based on the comparison, the timing profile for opening and closing the barrier 104 is determined. The barriers 104 are moved by the barrier actuator 108 from the closed position to the open position based on the timing profile in order to ascertain that a single transit user 204 pass through the gate 102 at once. Since the first transit user 204A and the second transit user 204B are close enough, the barriers 104 are moved from the open position to the closed position based on the timing profile. For example, the timing for closing the barrier 104 for the first transit user 204A may be decreased so that the second transit user 204B may not enter the gate 102 while the barrier 104 are open since the second transit user 204B is close to the first transit user 204A. The timing of the barrier 104 is adjusted to close between the two transit users despite them being close together. Without a tailgating situation, the timing would normally be longer before the fare gate 102 closes the barrier 104 after the first transit user 204A.

Figure 4B:
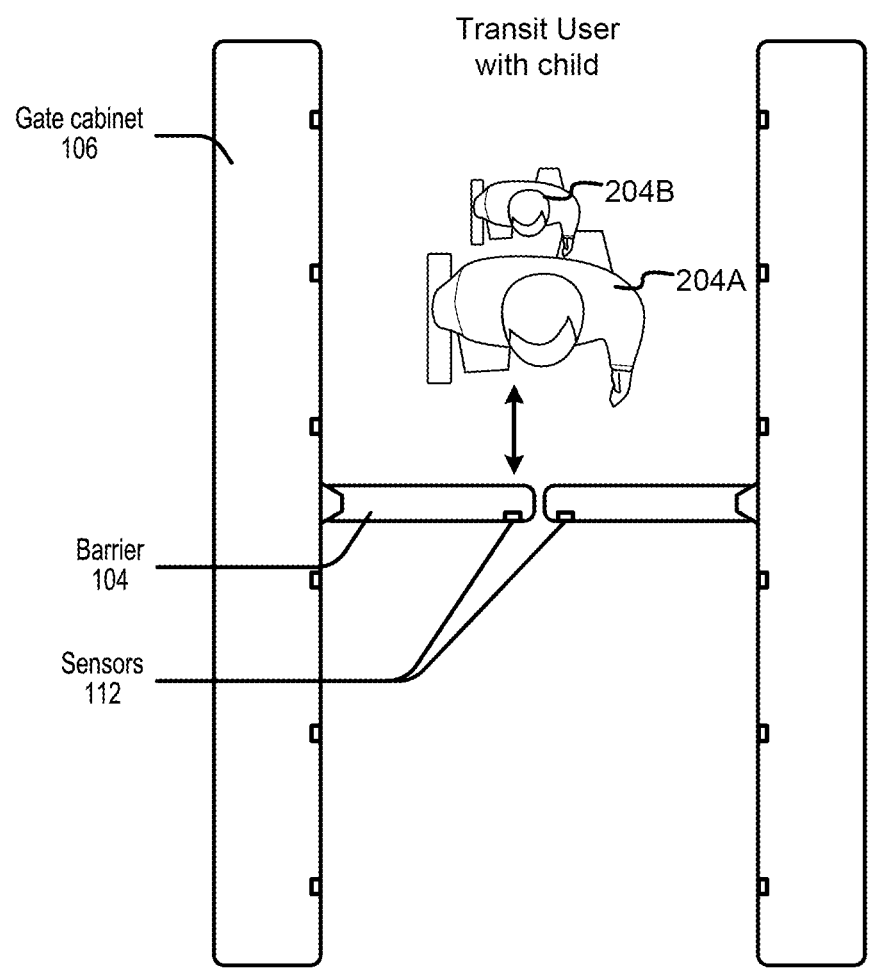

FIG. 4B illustrates an embodiment where a first transit user 204A is approaching the gate 102 with a child (a second transit user) 204B. The barrier sensors 112 determine a first transit user 204A as an adult based on the height information captured by the barrier sensors 112 mounted vertically across the barriers 104. Beam sensors 110 on the gate along with the barrier sensors 112 detect two transit users. The barrier sensors 112 determine that the second transit user 204B is a child based the height information of the second transit user 204A. Based on the determination that the first transit user 204A is travelling with the child 204B a corresponding timing profile is selected from the database of the gate system 100. The timing profile includes that the opening time and closing time for the barriers 104 be increased. For example, three times the usual time that the barriers 104 are opened such that the first transit user 204A may safely walk across the aisle with the child 204B without getting hurt by the closing of the barrier 104.

Figure 4C:
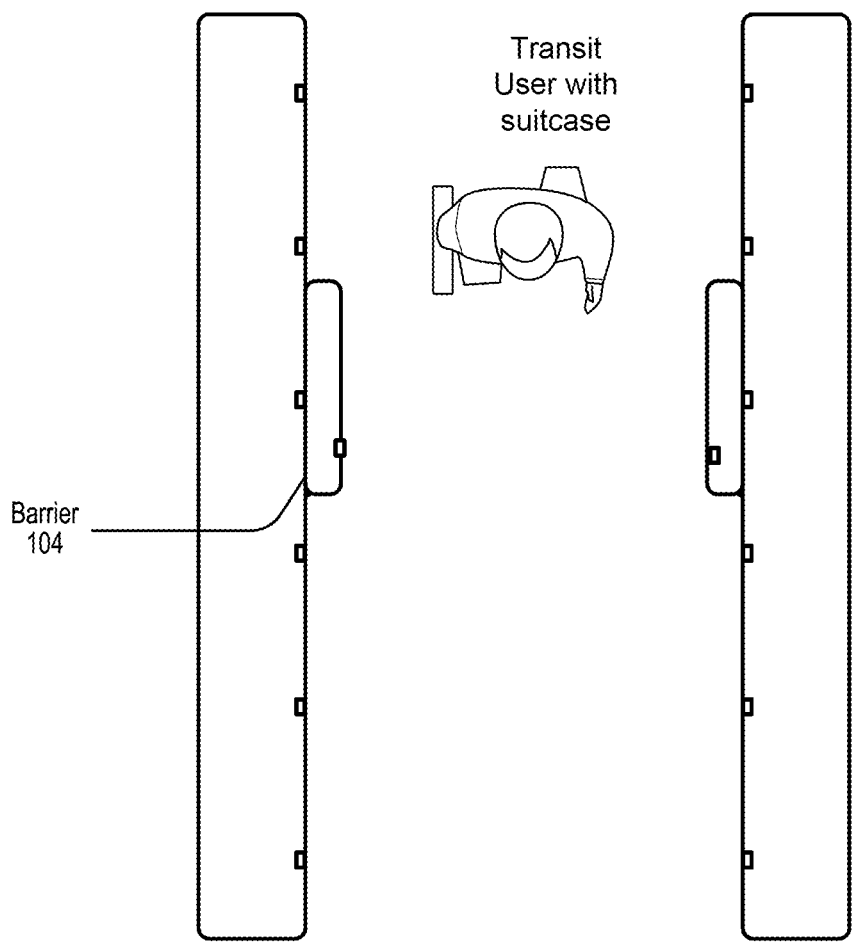

FIG. 4C illustrates an embodiment where a transit user 204 is approaching the gate 102 with a suitcase or briefcase. In other embodiments, the suitcase could be a roller board dragged behind the transit user 204. The barrier sensors 112 identify the transit user 204 along with the suitcase and allow a corresponding timing profile associated with the suitcase to be implemented on the barrier 104. The timing profile may include increasing the opening or closing time of the barrier 104. In another embodiment, the transit user on a wheelchair may be identified by the barrier sensors 112 and the corresponding timing profile associated with the wheelchair is implemented on the barrier 104. The timing profile may include increasing the opening or closing time of the barrier 104 for these circumstances.

Figure 5A:
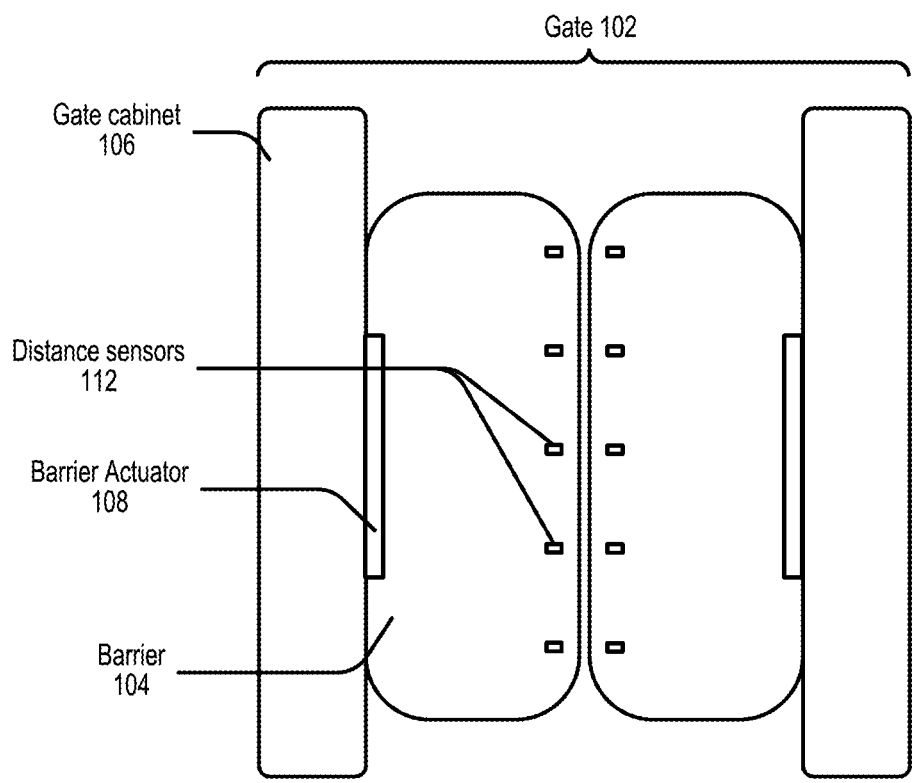
FIGS. 5A-5C depict block diagrams of embodiments of portions of fare gates having different barrier sensor configurations.

FIG. 5A illustrates the gate 102 in which the barrier sensors 112 are distributed vertically along the barriers 104 to determine height information regarding a transit user in front of the gate 102. In this embodiment, five barrier sensors 112 are distributed vertically along each of the barriers 104. However, more or less than five sensors 112 may also be used in other embodiments. The sensors 112 capture measurements simultaneously, concurrently, or sequentially, depending on the functionality of gate system 100. Based on the height information of the transit user 204, it is identified whether the transit user 204 is likely to be a child or an adult. A timing profile of the barriers 104 including the timing of closing and opening of the barriers 104 is selected from the database of the gate system 100 based on the identified that the transit user 204 is the child or an adult. In case the transit user 204 is identified as the child, the timing of closing the barrier 104 is increased. For example, for an adult, the timing of closing the barrier 104 is for example, 5 secs, accordingly, for the child the timing of closing the barrier 104 may be 15 secs.

Figure 5B:
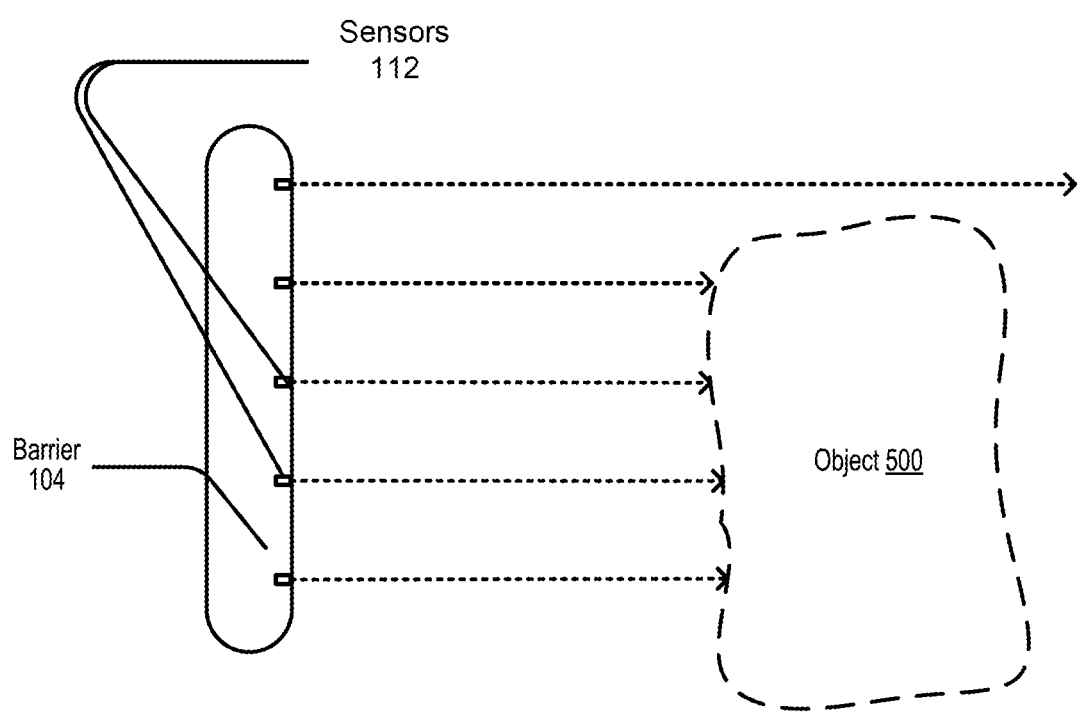

FIG. 5B illustrates a side view of the gate 102 with the barrier sensors 112 distributed vertically along the barriers 104. The barrier sensors 112 measure distances along a range of heights such that the height and shape of an object 500 may be estimated. The distances may then be used to categorize the object as, for example, a child, a suitcase, a wheelchair, and the like. The barrier sensors 112 in some embodiments could be arranged at different horizontal or vertical angles instead of all being arranged perpendicular to the barrier. When the angles are varied, an approaching object 500 is easier to detect at different angles of approach.

Figure 5C:
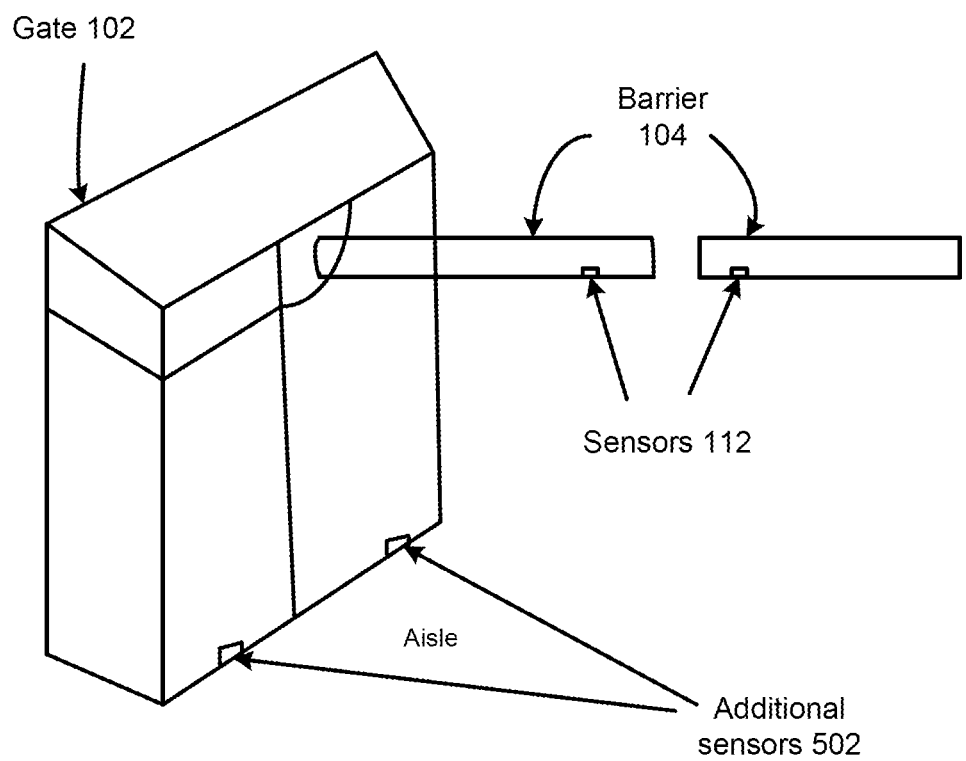

FIG. 5C illustrates a side view of the gate 102 with foot sensors 502. The sensors 502 are mounted on a side of the gate 102 facing the barrier 104 and the aisle. The foot sensors 502 along with the barrier sensors 112 determine the presence of the transit users 204 while they pass through the aisle. The foot sensor 502 is used to determine whether one transit user 204 is in front of the barrier 504 or more than one transit user 204 are approaching towards the barrier 104. The barrier sensors 112 and the foot sensor 502 further are used to determine whether a transit user 204 is next to the transit user 204 that is a child or an adult. Based on the determination, the timing profile of opening of the barrier 104 is selected and applied to the barrier 104. This avoids any tailgating on the gate 102, ensures that one person enters though the gate 102 at a time and a first transit user 204 in a queue is allowed to enter through the gate 102 first.

Figure 6:
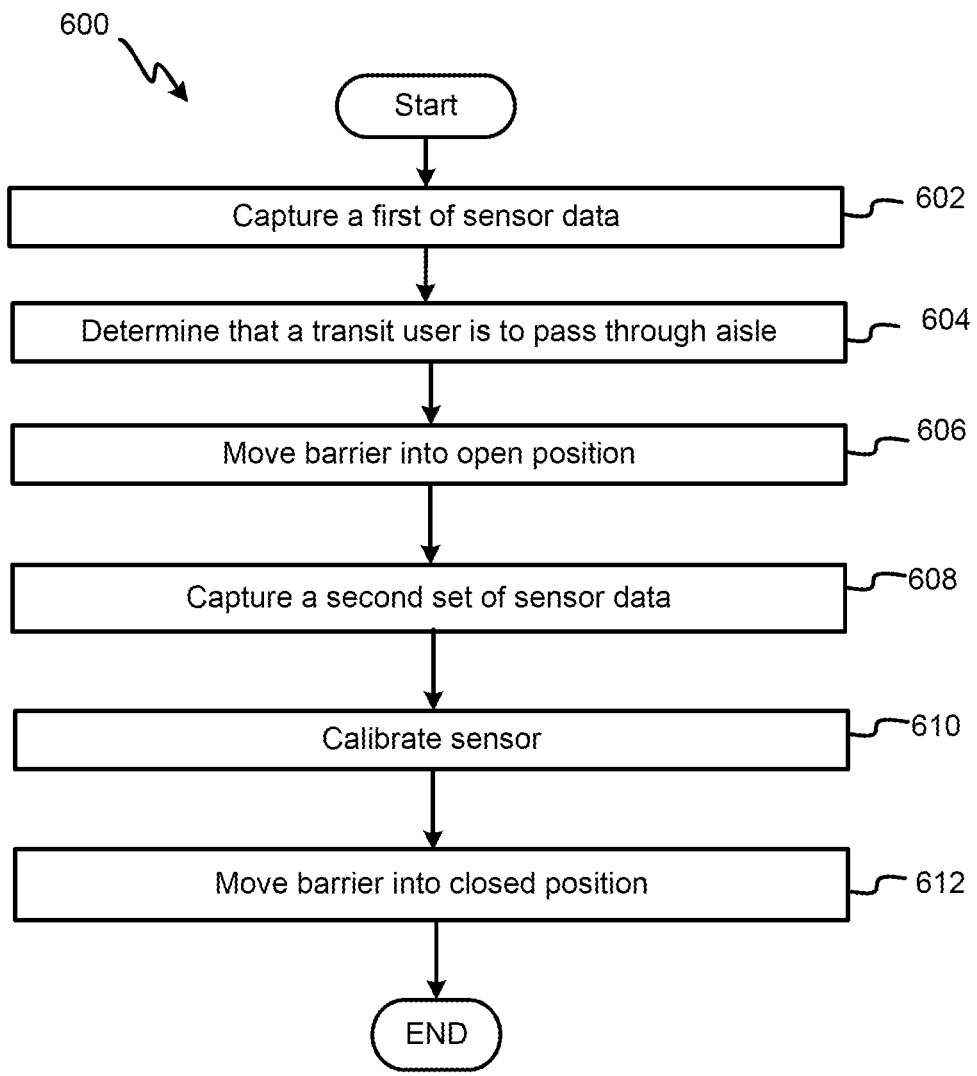
FIGS. 6-10 illustrate flowcharts of different embodiments of a method for operating a fare gate.

FIG. 6 illustrates a method 600 of a barrier sensor 112 of a fare gate 102 to capture sensor data and actuate barriers 104 based on the sensor data, in accordance with an embodiment of the present disclosure. The depicted portion of the method 600 starts at block 602 where a first set of sensor data is captured using the barrier sensor 112 mounted on a barrier of the fare gate 102. The fare gate 102 includes one or more barriers 104, and each barrier 104 has a barrier sensor 112 mounted on it. The barriers 104 are moved between an open position and a closed position using barrier actuators 108. The gate 102 includes gate cabinets with the barriers mounted to the gate cabinets 106. The barrier sensors 112 capture a first set of sensor data while the barrier 104 is in the closed position. The first set of sensor data includes distances between the barrier sensor 112 and a transit user 204 in the line of sight of the barrier sensor 112.

At block 604, it is determined based on the first set of sensor data that the transit user 204 is to pass through the fare gate along an aisle formed by the fare gate 102. The first set of sensor data indicates that the distance between the barrier sensor 112 and the transit user 204 is decreasing over time, and therefore the transit user 204 is approaching the fare gate 102.

At block 606, the barrier 104 is moved from the closed position into the open position using the barrier actuator 108. The barrier actuator 108 rotates the barrier 104 such that the barrier sensor 112 is orientated across the aisle. That is, the line of sight of the barrier sensor 112 may be perpendicular to the aisle and/or a gate cabinet 106.

At block 608, a second set of sensor data is captured using the barrier sensor 112. The second set of sensor data is captured while the barrier 104 is moved to the open position. The barrier sensor 112 scans across the aisle and captures distances across the aisle while the barrier 104 moves into the open position.

At block 610, the barrier sensor 112 is calibrated based on a predetermined point as the movement of the barrier 104 scans across the aisle during opening. The predetermined point is a predetermined width of the aisle, a distance between the gate cabinets 106, a distance between the barriers 104, and/or a distance between the barriers 104 and the gate cabinet 106. Other embodiments could calibrate against any stationary point in the station that is visible from the barrier sensor 112.

At block 612, the barrier 104 is moved from the open position into the closed position using the actuator 108. The actuator 108 rotates the barrier 104 such that the barrier sensor 112 is orientated down the aisle that is the line of sight of the barrier sensor 112 is substantially parallel to the aisle and/or the gate cabinet 106.

Figure 7:
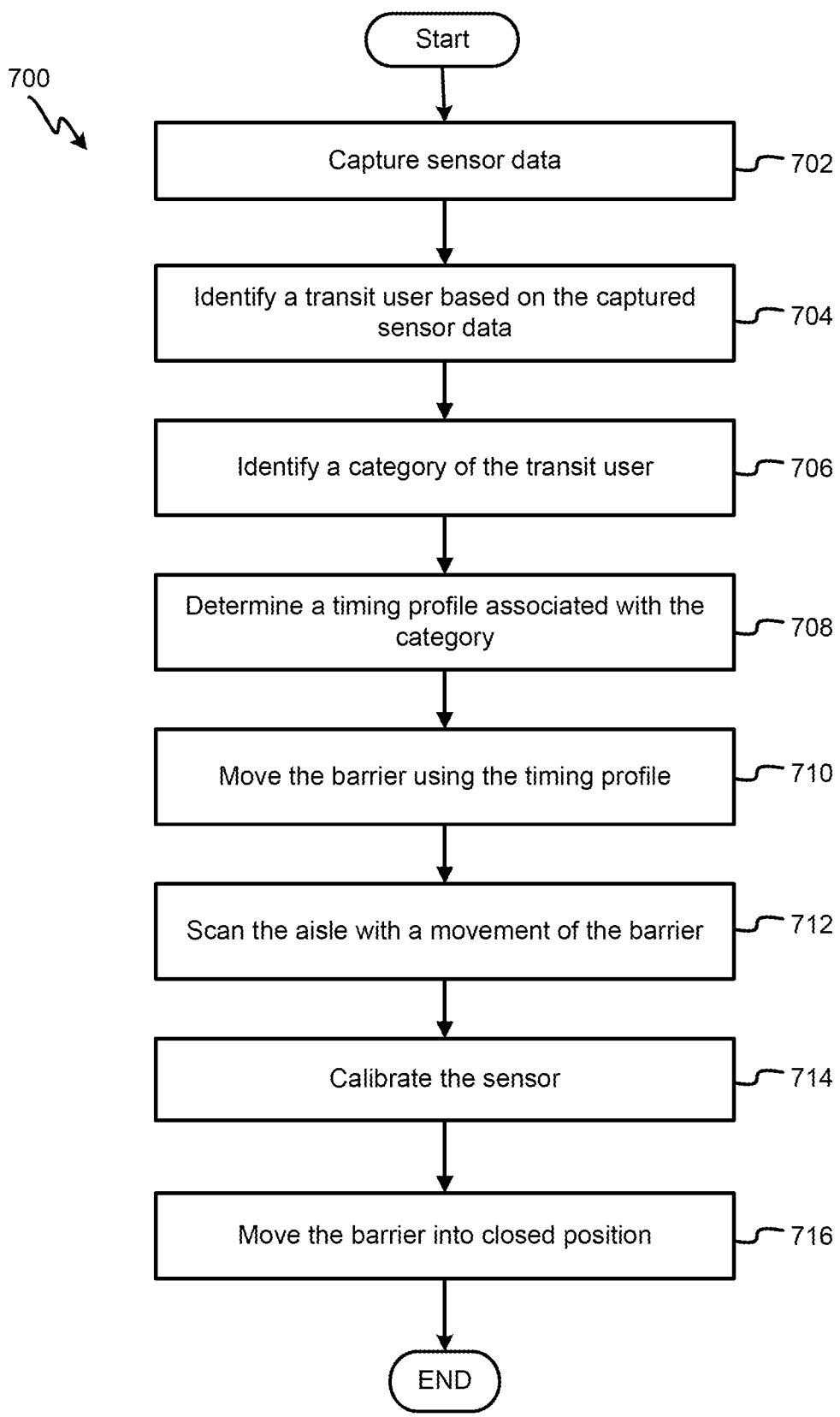

FIG. 7 illustrates a method 700 for opening and/or closing a barrier 104 of a fare gate 102 for a transit user 204, in accordance with an embodiment of the present disclosure. The depicted portion of the method 700 starts at block 702 where sensor data is captured using a barrier sensor 112 mounted on a barrier 104 of the fare gate 102. The fare gate 102 may include one or more barriers 104 with each barrier 104 including the barrier sensor 112. The barrier sensor 112 may be a capacitive sensor, an inductive sensor, an ultrasonic sensor, a Light Detection and Ranging (LIDAR) sensor, or a radar sensor. One or more barrier sensors 112 may also be mounted on each of the barriers 104. In another embodiment, the barrier sensors 112 may be vertically mounted in a row along a length of the barrier 104.

The fare gate 102 includes a pair of gate cabinets 106 with the barrier 104 on each of the gate cabinet 106. The barrier sensor 112 gathers data across an aisle formed by the fare gate 102 in between the gate cabinets 106. Each barrier 104 includes an actuator that moves the barrier 104 between an open position and the closed position. In the open position, the barrier 104 is moved such that a line of sight of the barrier sensor 112 is perpendicular to the aisle and/or the gate cabinet 106. In the closed position, the barrier 104 is moved such that the line of sight of the barrier sensor 112 is parallel to the aisle and/or the gate cabinet 106.

At block 704, a transit user 204 is identified approaching the fare gate 102 based on sensor data. Distances between the transit user 204 and the barrier sensor 112 are continuously determined by the barrier sensor 112 to identify that the transit user 204 is approaching the fare gate 102 when the distances to the barrier sensor 112 decreases over time. It is determined that the transit user 204 is to pass through the fare gate 102 along the aisle.

At block 706, a category of the transit user is determined based on the sensor data. The barrier sensor 112 identifies a height and/or shape of the transit user 204. A single barrier sensor 112 may identify the height and/or the shape of the transit user 204 or the vertically mounted sensors on the barrier 104 may identify the height and/or shape of the transit user 204. A category of the transit user 204 is determined based on the height and/or shape of the transit user 204. The category may include characteristics such as an adult, a child, a wheelchair, and/or a luggage. The categories of the transit user 204 may be stored in a database and/or a server of the fare gate 102.

At block 708, a timing profile associated with the category of the transit user 204 is determined. The timing profile may be stored in the database of the fare gate or on the fare card or ticket for the particular transit user 204. The timing profile includes a timing for opening and closing of the barriers which may be increased or decreased from a usual timing based on the category of the transit user 204.

At block 710, the barrier 104 is moved from the closed position into the open position based on the timing profile of the transit user 204. For example, if the transit user 204 is identified as child, the timing profile may include an increased opening and closing time of the barriers 104. For example, the timing may be increased by five times from the usual timing for an adult. If the transit user 204 is identified as the adult, the timing profile may include the opening and closing time as usual. If the transit user 204 is on a wheelchair, the timing for opening and closing of the barrier may be increased to three times from the usual timing. Similarly, for passing the suitcase with a transit user 204 through the barriers 104, the timing for opening and closing of the barrier may be increased by double from the usual timing.

At step 712, the aisle is scanned with the movement of the barrier 104 using the barrier sensor 112. The barrier sensor 112 of the barrier 104 scans the aisle for measuring distances across the aisle when the barrier 104 moves to the open position.

At step 714, the barrier sensor 112 is calibrated based on a predetermined point as the movement of the barrier 104 scans across the aisle during opening. The predetermined point is a predetermined width of the aisle, a distance between the gate cabinets 106, a distance between the barriers 104, and/or a distance between the barriers 104 and the gate cabinet 106.

At step 716, the barrier 104 is moved from the open position into the closed position by the barrier actuator 108 after calibrating the barrier sensor 112.

Figure 8:
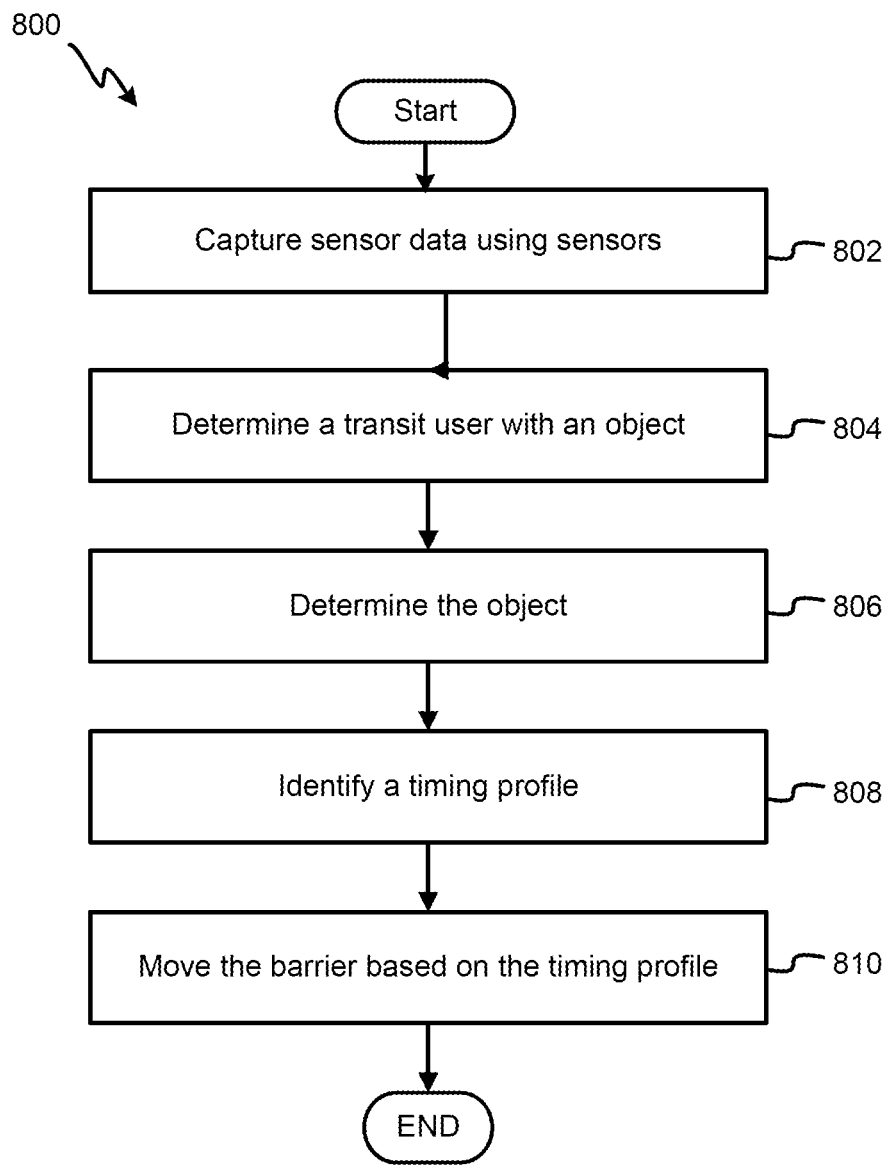

FIG. 8 illustrates a method 800 for opening and/or closing a barrier 104 of a fare gate 102 for a transit user 204 with an object 500, in accordance with an embodiment of the present disclosure. The depicted portion of the method 800 starts at block 802 where sensor data is captured using a plurality of barrier sensors 112 mounted on a barrier 104 of the fare gate 102. The barrier sensors 112 scan across an aisle formed by the fare gate 102.

The fate gate 102 may include one or more barriers 104 with each barrier 104 including the plurality of barrier sensors 112. The barrier sensors 112 may be vertically mounted in a row along a length of the barrier 104. Other embodiments could mount them horizontally or both vertically and horizontally or any number of patterns. The fare gate 102 includes a pair of gate cabinets 106 with the barrier 104 on each of the gate cabinet 106. Additional barrier sensors 112 may be mounted on sides of the gate cabinet 106 facing towards the opposite barrier 104 and inwards towards the aisle. Each barrier 104 of the fare gate 102 includes an actuator 108 that moves the barrier 104 between an open position and the closed position. In the open position, the barrier 104 is moved such that a line of sight of the barrier sensor 112 is perpendicular to the aisle and/or the gate cabinet 106. In the closed position, the barrier 104 is moved such that the line of sight of the barrier sensor 112 is parallel to the aisle and/or the gate cabinet 106.

At block 704, a transit user 204 is identified approaching the fare gate 102 based on the sensor data. The distances between the barrier sensors 112 and the transit user 204 are used to determine an approaching transit user 204. The vertically arranged barrier sensors 112 identify that the transit user 204 is an adult based on a height and/or shape information of the transit user 204. The additional barrier sensors 112 identify presence of an additional object along with the transit user 204 based on scanning the transit user 204 and an area of the aisle.

At block 806, the height information and the shape of the object is determined using the sensors. Based on the height and the shape information of the object, it is further determined whether the object is a child, luggage, or another transit user.

At block 806, a timing profile associated with the object 500 is determined. The timing profile may be stored in a database of the fare gate 102 or on the fare card or transit pass for the transit user 204. The timing profile includes a timing for opening and closing of the barriers 104 which may be increased or decreased from a normal timing of the transit user 204 based on the identification of the object 500. For example, if the transit user 204 is along with a child, the timing profile may include increasing an opening and closing time of the barriers by fifteen times from the normal timing of the transit user 204 to allow safe passage. If the transit user 204 is identified with another transit user 204 in close proximity, the timing profile may include the opening and closing time based on a speed of the other transit user 204 and/or the distance between them. Similarly, for passing the luggage along with the transit user 204, the timing for opening and closing of the barrier 104 may be increased by five times from the usual timing.

At block 810, the barrier 104 is moved from the closed position into the open position based on the timing profile of the transit user 204. The timing of opening and closing of the barriers 104 is therefore modified based on a condition of the transit user 204. That is, whether the transit user 204 is passing through the fare gate 102 alone, with a child, or with luggage.

Figure 9:
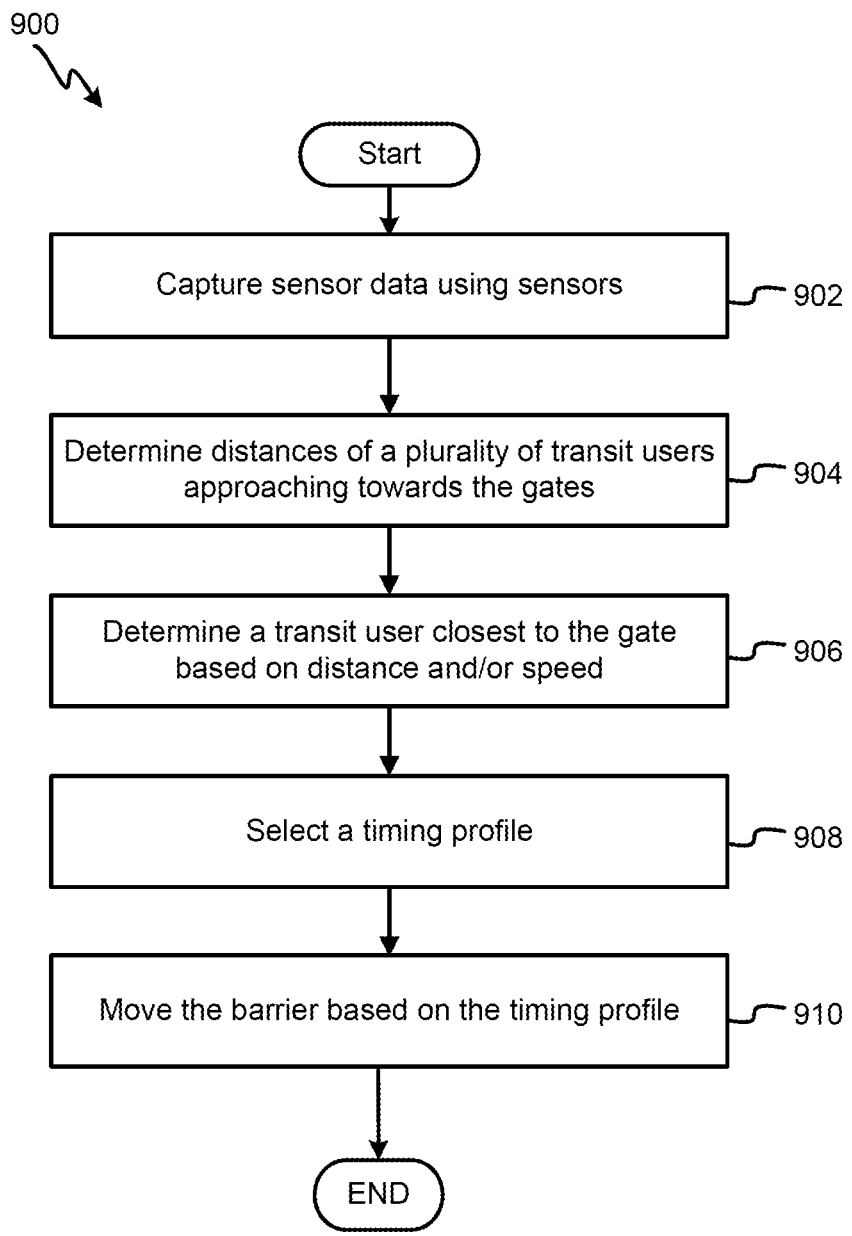

FIG. 9 illustrates a method 900 for opening and/or closing a barrier 104 of a fare gate 102 to avoid tailgating, in accordance with an embodiment of the present disclosure. The fare gate 102 includes a pair of gate cabinets 106 with the barrier 104 on each of the gate cabinet 106. Each barrier 104 includes an actuator 108 that moves the barrier 104 between an open position and the closed position. In the open position, the barrier 104 is moved such that a line of sight of a barrier sensor 112 is perpendicular to the aisle and/or the gate cabinet 106. In the closed position, the barrier 104 is moved such that the line of sight of a barrier sensor 112 is parallel to the aisle and/or the gate cabinet 106. The depicted portion of the method 900 starts at block 902, where sensor data is captured using a one or more barrier sensors 112 mounted on a barrier 104 of the fare gate 102. The fare gate 102 may include a pair of barriers 104 with each barrier 104 including the one or more barrier sensors 112. The barrier sensors 112 capture data across an aisle formed by the fare gate 102. The barrier sensors 112 may be vertically mounted in a row along a length of the barrier 104. Additional barrier sensors 112 may be mounted on sides of the fare gate 102 facing towards the barrier 104 and inwards towards the aisle.

At block 904, distances between the barrier sensors 112 and a plurality of transit users 204 approaching towards the fare gate 102 are determined using the sensor data. Two or more transit users 204 may be closest to the fare gate 102. Respective distances between the barrier sensors 112 and the transit users 204 are compared among themselves to identify two minimum distances of the transit users 204 to the barrier sensors 112. This results in identification of two closest transit users 204 to the fare gate 102. Distances between the two identified transit users 204 are determined based on the sensor data and compared with a predetermined distance threshold value. Speeds of the two transit users 204 are determined based on the sensor data and compared with a predetermined speed threshold value. Based on the comparison with the predetermined distance threshold value and the predetermined speed threshold value, it is determined that the two transit users 204 are close to the fare gate 102 and may result in the tailgating situation indicating fare evasion.

At block 906, based on the distance and the speed of the two transit users 204, a first transit user 204 closest to the fare gate 102 is determined, the other transit user 204 is determined as a second transit user 204. It is determined that the barriers 104 are opened for the first transit user 204 and then for the second transit user 204. A single transit user 204 is allowed to pass through the barriers 104 when the barriers 104 are in the open position.

At block 908, a timing profile based on the distance between the two transit users 204 and/or the speeds of the two transit users 204 is determined. The timing profile may be stored in a database of the fare gate 102. The timing profile includes a timing for opening and closing of the barriers 104.

At block 910, the barriers 104 are moved from the closed position to the open position based on the timing profile. In this case, when the distance between the two transit users 204 is less than the predetermined distance threshold value and the speeds of the transit users 204 exceed the predetermined speed threshold value, the timing profile for the first transit user 204 includes the timing for the opening and/or closing the barriers 104 be decreased such that the second transit user 204 does not pass along with the first transit user 204 through the opened barriers 104. If the speed of the second transit user 204 is less than the predetermined speed threshold value and the distance between the first and the second transit user 204 is greater than the predetermined distance threshold value, the timing profile includes the timing for the opening and/or closing the barriers 104. The normal timing is maintained as the second transit user 204 cannot pass along with the first transit user 204 through the opened barriers 104.

Figure 10:
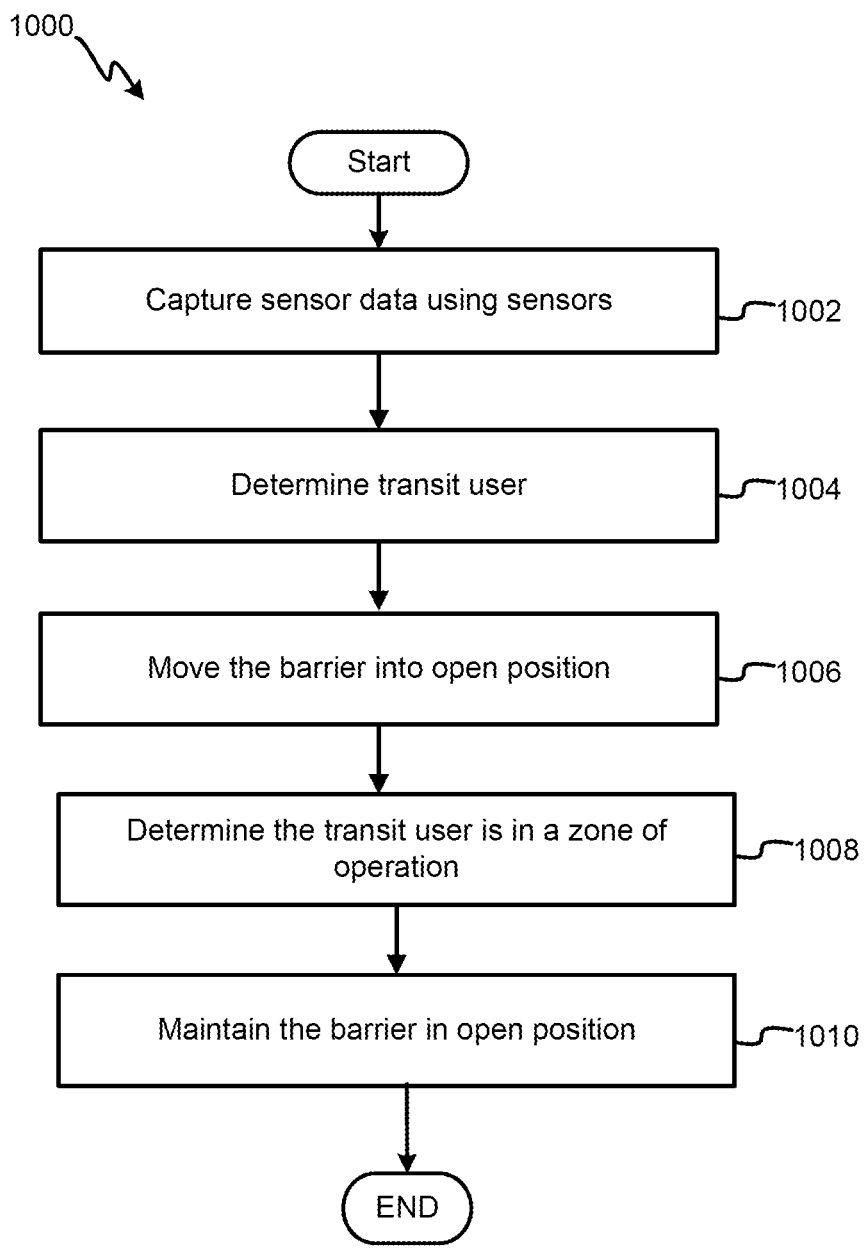

FIG. 10 illustrates a method 1000 for identifying presence of a transit user 204 in a zone of operation, in accordance with an embodiment of the present disclosure. The fare gate 102 may include a pair of gate cabinets 106 with a barrier 104 attached to each of the gate cabinets 106. Each barrier 104 includes an actuator 108 that moves the barrier 104 between an open position and the closed position. In the open position, the barrier 104 is moved such that a line of sight of a barrier sensor 112 is perpendicular to an aisle and/or the gate cabinet 106. In the closed position, the barrier 104 is moved such that the line of sight of a barrier sensor 112 is parallel to the aisle and/or the gate cabinet 106. The depicted portion of the method 1000 starts at block 1002 where sensor data is captured using a barrier sensor 112 mounted on each of the barrier 104 of the fare gate 102. The barrier sensors 112 capture data across the aisle formed by the fare gate 102.

At block 1004, a transit user 204 is identified approaching the fare gate 102 based on the sensor data. The distances between the barrier sensors 112 and the transit user 204 are determined to identify that the transit user 204 is approaching the fare gate 102.

At block 1006, the barrier 104 is moved to the open position by the actuator 108 to allow the transit user 204 to pass through the fare gate 102.

At block 1008, as the transit user 204 is approaching towards the fare gate 102, it is determined whether the transit user 204 is in a zone of operation of the fare gate 102. The determination is based on the distance between the transit user 204 and the sensor identified using the sensor data. The zone of operation is a predetermined minimum distance and time of the barriers of the fare gate 102 where the barriers 104 are closed after the transit user 204 may have passed through the barriers 104. If the transit user 204 falls within the zone of operation, the barriers 104 will move to the closed position.

At block 1010, on determining that the transit user 204 is in the zone of operation, the barriers 104 are prevented from moving into the closed position and maintained in the open position until the transit user 204 passes through the barriers 104. This provides a safe operation of the barriers 104 such that the transit user 204 is not hurt by the movement of the barriers 104 while being in the zone of operation.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A fare gate for a transportation system, the fare gate comprising:
   a barrier configured to move between a closed position and an open position;
   a sensor mounted on the barrier and configured to:
      capture sensor data across an aisle formed by the fare gate,
      determine based on the sensor data that a first transit user is to pass through the fare gate along the aisle,
      scan the aisle with a movement of the barrier, and
      sense a plurality of distances across the aisle; and
   an actuator configured to actuate the barrier to move from the closed position into the open position, wherein the sensor is calibrated after moving away from the closed position based on scanning across the aisle to a predetermined point read by the sensor.

2. The fare gate for the transportation system of claim 1, wherein the sensor is one of a capacitive sensor, an inductive sensor, an ultrasonic sensor, a Light Detection and Ranging (LIDAR) sensor, or a radar sensor.

3. The fare gate for the transportation system of claim 1, wherein the predetermined point is a predetermined width of the aisle and the plurality of distances are distances in the open position and the closed position of the barrier.

4. The fare gate for the transportation system of claim 1, wherein the barrier is actuated to move into the open position by rotation of the barrier such that the sensor is positioned to gather information across the aisle.

5. The fare gate for the transportation system of claim 1, wherein the sensor is further configured to determine a distance and a velocity of the first transit user based on the sensor data.

6. The fare gate for the transportation system of claim 1, wherein a first plurality of sensors are mounted on the barrier of the fare gate and a second plurality of sensors are mounted on the fare gate to view across the aisle of the fare gate and to detect the first transit user pass through the fare gate along the aisle.

7. The fare gate for the transportation system of claim 6, wherein the first plurality of sensors mounted on the barrier are at different horizontal elevations with respect to each other.

8. The fare gate for the transportation system of claim 6, wherein an additional sensor is mounted on a side of the fare gate facing towards the barrier.

9. The fare gate for the transportation system of claim 1, wherein the sensor is further configured to:
   determine respective distances of a plurality of transit users to the fare gate;

determine a second transit user among the plurality of transit users at a minimum distance to the fare gate among the respective distances based on a comparison of the respective distances to a threshold distance; and modify a time of opening of the barrier for the second transit user and other transit users based on the respective distances of the plurality of transit users to the fare gate.

10. The fare gate for the transportation system of claim 9, wherein the sensor is further configured to:

determine whether a third transit user is in a zone of operation of the fare gate, wherein the zone of operation is a predetermined distance from the barrier; and the actuator is further configured to:

retain the barrier in the open position based on the determination that the third transit user is in the zone of operation.

11. The fare gate for the transportation system of claim 1, wherein the sensor is further configured to:

identify a category of the first transit user based on the sensor data, the category is associated with a height and/or a shape of the first transit user; and determine a profile associated with the category of the first transit user, the profile includes timing for opening and closing the barrier; and wherein the actuator is further configured to actuate the barrier based on the profile.

12. The fare gate for the transportation system of claim 11, wherein the sensor is further configured to:

identify an age group of the first transit user based on the category of the first transit user;

identify presence of an object, a child, and/or a luggage with the first transit user based on the sensor data; and determine a timing profile of the barrier for opening or closing the barrier based on the presence of the object, the child, and/or the luggage with the first transit user.

* * * * *